US012661949B2

(12) United States Patent
George et al.

(10) Patent No.: US 12,661,949 B2
(45) Date of Patent: Jun. 23, 2026

(54) SYSTEM AND METHOD OF PRE-LOADING A TWO-PHASE COOLING SYSTEM FOR ELECTRIC VEHICLES

(71) Applicant: FCA US LLC, Auburn Hills, MI (US)

(72) Inventors: Alexander J George, Whitmore Lake, MI (US); Michael Wiland, Washington Township, MI (US)

(73) Assignee: FCA US LLC, Auburn Hills, MI (US)

( * ) Notice: Subject to any disclaimer, the term of this patent is extended or adjusted under 35 U.S.C. 154(b) by 147 days.

(21) Appl. No.: 18/417,442

(22) Filed: Jan. 19, 2024

(65) Prior Publication Data

US 2025/0236152 A1 Jul. 24, 2025

(51) Int. Cl.
B60H 1/00 (2006.01)

(52) U.S. Cl.
CPC ..... B60H 1/00385 (2013.01); B60H 1/00278 (2013.01); B60H 1/00921 (2013.01); B60H 2001/00307 (2013.01); B60H 2001/00928 (2013.01)

(58) Field of Classification Search
CPC ........... B60H 1/00385; B60H 1/00278; B60H 1/00921; B60H 2001/00307; B60H 2001/00928
See application file for complete search history.

(56) References Cited

U.S. PATENT DOCUMENTS

| | | | |
|---|---|---|---|
| 2021/0086585 A1* | 3/2021 | Chatham | B60H 1/00885 |
| 2021/0188043 A1* | 6/2021 | Smith | B60H 1/3204 |
| 2022/0361371 A1* | 11/2022 | Unton | H05K 7/20818 |
| 2023/0415593 A1* | 12/2023 | Lee | H01M 10/615 |

FOREIGN PATENT DOCUMENTS

KR 2020/0096866 A 8/2020

* cited by examiner

*Primary Examiner* — Elizabeth J Martin
*Assistant Examiner* — Adam Dorrel Moore
(74) *Attorney, Agent, or Firm* — Jeremy J. Klobucar

(57) ABSTRACT

A cooling system for an electric vehicle includes a cooling system loop including a refrigerant, a compressor, and a condenser. The cooling system loop is configured to receive the refrigerant after the refrigerant exits the condenser. The cooling system loop comprises a separator configured to receive liquid refrigerant, and a component located downstream from the separator. A vehicle plug monitor circuit generates a plug monitor signal when the vehicle is coupled to an external power source. A controller operates the compressor in response to the plug monitor signal to communicate liquid refrigerant to the separator.

9 Claims, 5 Drawing Sheets

SYSTEM AND METHOD OF PRE-LOADING A TWO-PHASE COOLING SYSTEM FOR ELECTRIC VEHICLES

FIELD

The present disclosure relates generally to a cooling system for an electric vehicle and, more specifically, to a system and method for pre-loading the two-phase cooling system with liquid refrigerant.

BACKGROUND

Vehicles with electric propulsion systems are becoming increasingly more common. Some electrically propelled vehicles include an electric drive motor at each wheel of the vehicle, and some electrically propelled vehicles include a front electric drive motor for rotating the front wheels of the vehicle and a rear electric drive motor for rotating the rear wheels of the vehicle. In either case, the electric drive motors may include a power inverter device that is configured to convert DC power supplied by a battery of the vehicle to AC power for use by the electric drive motor to provide a motive force for the wheels.

The electric drive motors, power inverter devices, and battery generate heat during use thereof. As a result, the electric drive motors, power inverter devices, and battery may require cooling during use thereof. Methods of cooling the electric drive motors and power inverter devices currently include using a cooling system having a dedicated heat exchanger that circulates a coolant that may be composed of a mixture of ethylene glycol and water through or around the electric drive motor (to cool a lubricant contained in the electric drive motor) and power inverter device. Methods of cooling the battery currently may include using a thermal gel that draws heat from cells of the battery to a cooling plate attached to or located proximate the battery, where the heat is then removed via forced convection using a coolant that may be similar to that used to cool the electric drive motor and power inverter device (e.g., a mixture of ethylene glycol and water). These systems require a chiller to remove heat from the coolant before it enters the electric drive motor, power inverter device, and battery. These methods of cooling these components, however, have relatively low controllability and, therefore, are slow reacting systems that do not permit increased or decreased cooling to be achieved as dynamically as may be required as the sophistication of these components increases.

Another type of system for cooling an electric vehicle is a refrigerant-based cooling system that uses refrigerant that is produced by a compressor and condenser in an energy-intensive process. The refrigerant changes between a liquid phase and a gas phase during the process. The liquid refrigerant is accumulated in liquid/vapor separators or reservoirs using a control metering system. The liquid refrigerant is then pumped through the heat exchanger to cool the main system components including but not limited to the cabin, electric drive motors, the battery and associated power electronics. The pressure in the separators and the associated heat exchanger loop are regulated to control the saturation temperature. Heat is removed from the hot elements via the latent heat of vaporization of the boiled refrigerant. Mixed phase refrigerant in liquid and vapor form returns to the liquid/vapor separator and reservoirs where the refrigerant in the gas phase exits and returns to the compressor where the gas phase is compressed and reduced to a liquid. During operation and at the beginning of the operation, the refrigerant mass is not uniformly distributed. Because the compressor uses a lot of power, redistributing the refrigerant when the vehicle is underway consumes a lot of power.

SUMMARY

In the present system, the compressor is active while the vehicle is electrically coupled to the power grid to allow the refrigerant to be liquidified and fill the liquid/vapor separators and reservoirs with preconditioned liquid refrigerant. By monitoring the liquid in the various reservoirs, the system can be used to selectively supply liquid refrigerant where needed within the vehicle. By providing the liquid refrigerant to various locations within the vehicle, the activation of the compressor is delayed which reduces the battery power consumption and increases the range of the electric vehicle.

In one aspect of the disclosure, a cooling system for an electric vehicle includes a cooling system loop including a refrigerant, a compressor, and a condenser. The cooling system loop is configured to receive the refrigerant after the refrigerant exits the condenser. The cooling system loop comprises a separator configured to receive liquid refrigerant and a component located downstream from the separator. A vehicle plug monitor circuit generates a plug monitor signal when the vehicle is coupled to an external power source. A controller operates the compressor in response to the plug monitor signal to communicate liquid refrigerant to the separator.

In another aspect of the disclosure, a method of operating a coolant system comprising a cooling system loop for a vehicle including a refrigerant, a compressor, a separator, a component to be cooled and a condenser. The cooling system loop is configured to receive the refrigerant after the refrigerant exits the condenser. The method includes generating a plug monitor signal when the vehicle is coupled to an external power source and operating, by a controller, the compressor in response to the plug monitor signal to communicate liquid refrigerant to the separator.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a block diagrammatic view of a controller for controlling the fill levels while the fill levels of refrigerant in the separators while the vehicle is plugged in;

DETAILED DESCRIPTION

Figure 1:
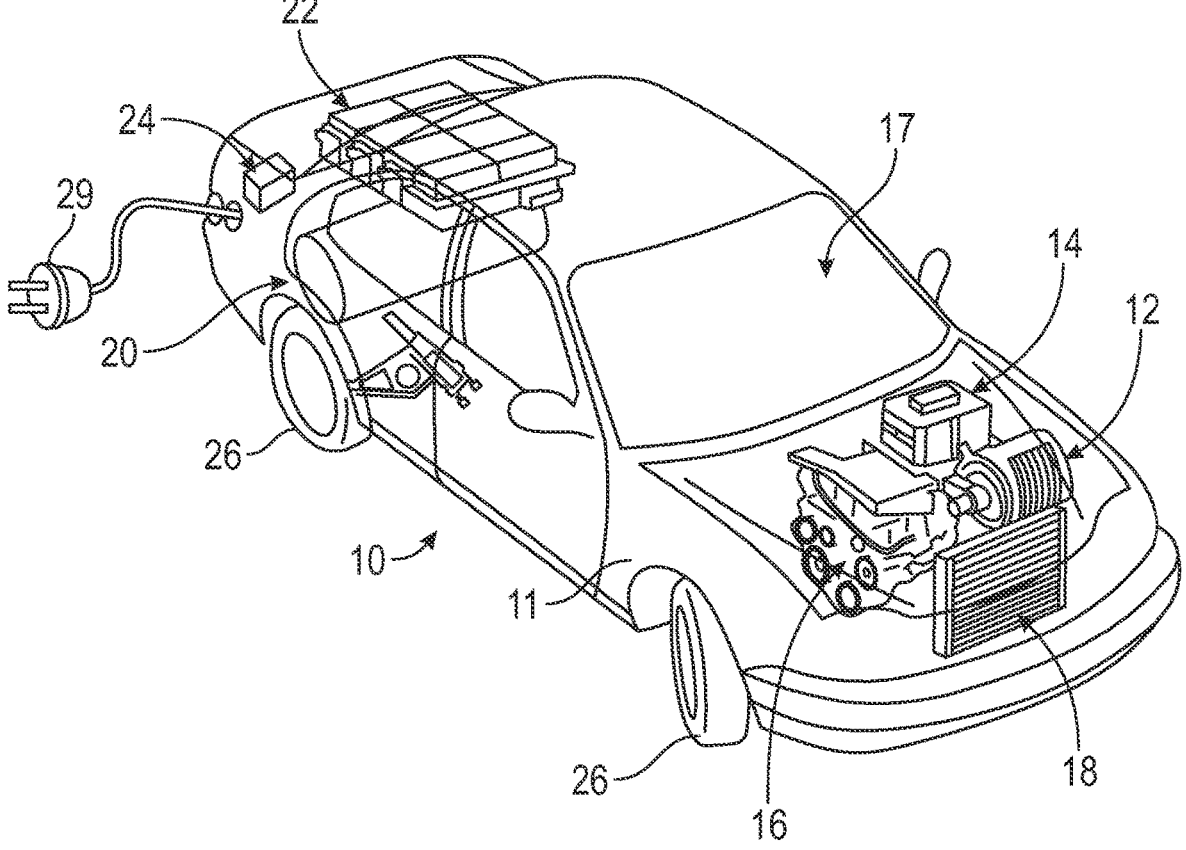
FIG. 1 illustrates a vehicle according to a principle of the present disclosure.

Example embodiments will now be described more fully with reference to the accompanying drawings. The example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a vehicle 10 according to the present disclosure is illustrated. The vehicle 10 in the illustrated embodiment is a hybrid vehicle including a vehicle body 11 that defines a cabin 17, an electric motor 12 and associated power electronics 14, an internal combustion engine 16, a condenser 18, a fuel source 20, a battery 22, a charger 24, and a plurality of wheels 26. If vehicle 10 is an electric vehicle rather than a hybrid vehicle, engine 16 and fuel source 20 may be omitted. As will be described in more detail below, condenser 18 is part of a cooling system 28 (FIG. 2) that can be used to cool electric motor 12, power electronics 14, and battery 22.

Figure 2:
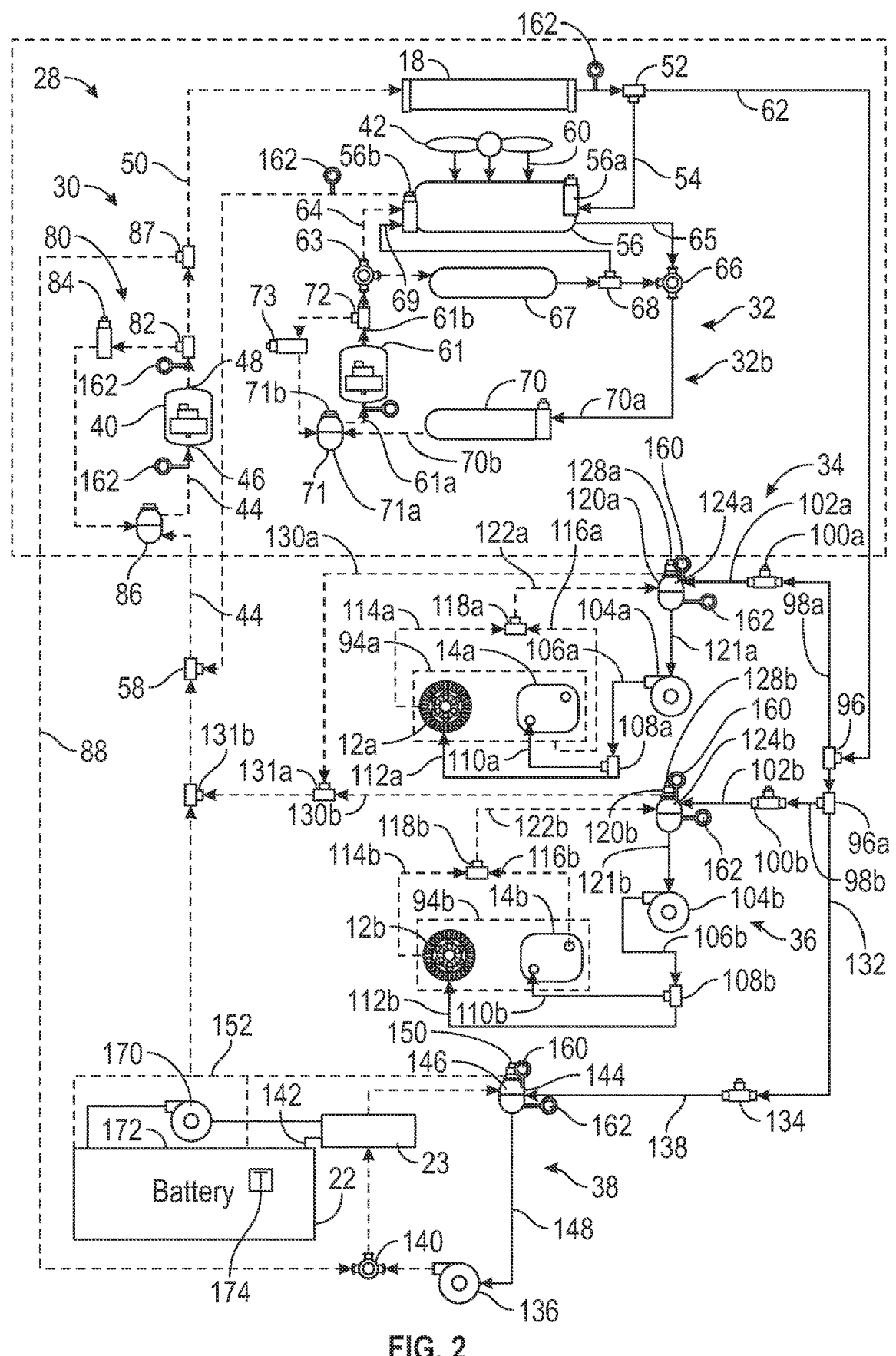
FIG. 2 is a schematic representation of a cooling system and cooling loop that may be used to cool an electric drive motor, power inverter device, and battery of the electric vehicle illustrated in FIG. 1.

Before proceeding with description of cooling system 28, it should be understood that while only a single electric motor 12 is illustrated in FIG. 1, one skilled in the art will readily acknowledge and appreciate that vehicle 10 may be provided with a plurality of electric motors 12 and associated power electronics 14. For example, the vehicle 10 may include a pair of electric motors 12 (e.g., as shown in FIG. 2) that each include an associated electronics device 14, with one of the electric motors 12 being configured to rotate the wheels 26 located a front of the vehicle 10 and the other electric motor 12 being configured to rotate the wheels 26 located at a rear of the vehicle 10. Alternatively, vehicle 10 may include four electric motors 12 that each include an associated electronics device 14 with each wheel 26 having a dedicated motor 12 for rotation thereof.

A vehicle plug 29 may be used to plug the vehicle into a power source external to the vehicle to charge the battery 22.

Referring now to FIG. 2, cooling system 28 includes a coolant or refrigerant loop 30 that includes a plurality of coolant or refrigerant sub-loops 32, 34, 36, and 38. Components of coolant loop 30 that are utilized by each of the coolant sub-loops 32, 34, 36, and 38 include a compressor 40, condenser 18 located at a front of vehicle 10, and an air moving device 42 such as a fan, which is configured to draw ambient air through condenser 18 so that heat transfer can occur between a refrigerant carried by coolant loop 30 and the ambient air. Compressor 40 and refrigerant can be any type of compressor or refrigerant known to one skilled in the art.

Sub-loop 32 generally is directed to cooling and/or heating an interior (e.g., cabin 17) of vehicle 10. Sub-loop 32 is configured to operate in at least two modes including a cooling mode where the interior of the vehicle 10 is cooled and a heating mode where the interior of the vehicle 10 is heated. In this regard, sub-loop 32 can operate as an air conditioner or a heat pump. In the illustrated embodiment of sub-loop 32, the coolant that circulates through coolant system 28 travels through a suction line 44 to a suction inlet 46 of compressor 40, which then compresses the refrigerant and discharges the compressed refrigerant through a discharge outlet 48 to a discharge line 50. Discharge line 50 is connected to the condenser 18 ultimately to a tee joint 52 downstream to the condenser 18. The tee joint 52 permits the compressed refrigerant to travel in the radiator outlet line 62 or to a first cabin heat exchanger inlet line 54 that is connected to a cabin heat exchanger 56 that is located within the interior of vehicle 10.

The heat exchanger 56 has an expansion device with shutoff 56a and a second expansion device 56b. The liquid flowing through the heat exchanger, the expansion device 56a and the expansion device 56b is ultimately communicated through tee joint 58 which couples to the suction line 44 of the compressor 40. The cabin has a cabin compressor 60 that has a suction inlet 61a and an outlet 61b. The cabin has a sub-loop 32b that is fluidically coupled from the coolant loop 30. The heat exchanger 56 receives coolant in vapor form from the compressor 61 at a vapor inlet through the switching valves 63. An outlet 65 from the heat exchanger 56 is communication with a switching a valve 66. The switching valve 63 is in fluid communication with an inner condenser 67. Ultimately, by controlling the switching valves 63, 66, a cooling or heating mode may be entered. Refrigerant from the switching valves 63 travels through the inner condenser 67 and to tee joint 68. Refrigerant from the tee joint 68 travels in liquid form to the heat exchanger through a liquid inlet 69. Fluid from the inner condenser 67 travels to an evaporator 70 through an evaporator inlet 70a. An evaporator outlet 70b travels to a fluid separator 71. That is, the separator 71 has a reservoir 71a used for storing both liquid and vapor. The separator 71 may also have a pressure regulator 71b. The evaporator 70 cools and dries air entering the passenger compartment. Vapor is ultimately drawn through the compressor 61. A tee joint 72 forms a loop with an expansion device with shutoff 73 that allows the refrigerant to travel back to the separator 71. Because the compressor 61 generates heat, the hot refrigerant in vapor form travels back to the separator 71 through the expansion device with shutoff 73. The sub-loops 32b thus forms a fluidically isolated heating or cooling loop depending on the position of the switching valves 63, 66.

Sub-loops 34 and 36 are designed to provide the refrigerant of cooling system 28 to a first drive assembly 94a and a second drive assembly 94b. Each drive assembly 94a, 94b includes an electric motor 12a and 12b, respectively, that have an associated power electronic module 14a and 14b, respectively, located proximate or attached thereto. Power electronic modules 14a and 14b may each be a power inverter device that is configured to convert DC power supplied by battery 22 of vehicle 10 to AC power for use by the electric drive motors 12a, 12b to provide a motive force to the wheels 26.

As noted above, sub-loops 34 and 36 are substantially similar to each other or identical. Accordingly, the below description of these sub-loops will predominantly be directed to sub-loop 34. Notwithstanding, to distinguish the features of sub-loop 34 from the features of sub-loop 36, the reference numbers associated with sub-loop 34 will include the letter "a" (e.g., drive assembly 94a) and the reference numbers associated with sub-loop 36 will include the letter "b" (e.g., drive assembly 94b).

Sub-loop inlet line 43 is attached to a tee-joint 96 that directs the refrigerant to each of sub-loop 34 and sub-loop 36. Specifically, tee-joint 96a directs the refrigerant to an inlet line 98a that is connected to a mass flow metering device 100a. Mass flow metering device 100a may be any type of mass flow metering device known to one skilled in the art. For example, mass flow metering device 100a may be a proportionally controlled valve that is actuated by using a solenoid, a stepper motor, or by rotating a worm gear. Mass flow metering device 100a can be used to control the amount of refrigerant that is permitted to reach drive assembly 94a, as will be described in more detail later.

After passing through mass flow metering device 100a, the refrigerant enters a mass flow metering device outlet line 102a that is connected to a separator 120a that is configured to store a portion of the refrigerant therein. The refrigerant may be in liquid for and or vapor form or both. Separator 120a is attached to a pump 104a via a first separator outlet line 121a. Pump 104a is configured to draw the refrigerant toward the sub-loop 34 from separator 120a. After exiting pump 104a, the refrigerant enters a drive assembly inlet line 106a that feeds the refrigerant to the drive assembly 94a. Drive assembly inlet line 106a is connected to a tee joint 108a that diverts the refrigerant to each of the electric drive motor 12a and power electronics module 14a.

Specifically, power electronics module 14a may be equipped with a jacket or heat sink that receives refrigerant from a power electronics module inlet line 110a. Similarly, electric drive motor 12a may be equipped with a jacket or heat sink that receives refrigerant from an electric drive motor inlet line 112a. Heat generated by electric drive motor 12a and power electronics module 14a may then be transferred to the refrigerant, which exits each of the electric drive motor 12a and power electronics module 14a through an electric drive motor outlet line 114a and power electronics outlet line 116a, respectively.

Outlet lines 114a and 116a are connected at tee joint 118a that is connected to a separator (e.g., accumulator) 120a by a separator inlet line 122a. When the refrigerant absorbs heat from electric drive motor 12a and power electronics module 14a, a portion of the refrigerant can undergo phase change from liquid to gas. Separator 120a includes a reservoir 124a that is configured to collect the liquid refrigerant from separator inlet line 122a (and also received from first mass flow metering device 100a) and return the liquid refrigerant back to pump 104. Although first separator outlet line 121a, where the liquid refrigerant can again be used to cool electric drive motor 12a and power electronics module 14a. Meanwhile, the gaseous refrigerant received by separator 120a from separator inlet line 122a may be released from separator 120a through a pressure regulation valve 128a located atop separator 120a. After exiting pressure regulation valve 128a, the gaseous refrigerant enters a second separator outlet line 130a that is connected to a first tee joint 131a together with the separator outlet line 130b. Another tee joint 131b couples the tee joint 131a to the suction line 44 of compressor 40.

Now description of the sub-loop 38 that is used to cool battery 22 will be described. Sub-loop 38 includes an inlet line 132 connected to tee joint 96a which is in fluid communication with tee joint 96. Inlet line 98b of sub-loop 36 is ultimately fluidically connected to radiator outlet line 62 through tee joints 96 and 96a. Likewise, refrigerant from inlet line 132 is ultimately fluidically connected to radiator outlet line 62 through tee joints 96 and 96a. Inlet line 132 is provided to another mass flow metering device 134 that is connected to another separator 144 by mass flow metering device outlet line 138, which provides the refrigerant to a pump 136 via a first battery separator outlet line 148. Pump 136 feeds the refrigerant to a switching valve 140 that provides the coolant to a heat exchanger 23 of battery 22 when opened to allow fluid flow from the pump 136. When fluid flows to the heat exchanger 23 heat generated by battery 22 is drawn into the atmosphere by the refrigerant passing therethrough. Fluid from the heat exchanger 23 is communicated through a pump 170 and into a housing 172 of the battery 22 where the fluid absorbs heat and returns to heat changer 23 through fluid line 142. When the refrigerant absorbs heat generated by battery 22, at least a portion of the refrigerant may undergo phase change to gas. The mixture of gaseous/liquid refrigerant exits the housing 172 of battery 22 through battery coolant outlet line 142 that is connected to separator 144. The temperature of the battery 22 as indicated by a temperature sensor 174 may be monitored by a controller as described later.

Separator 144 includes a reservoir 146 that is configured to collect the liquid refrigerant received from battery coolant outlet line 142 through the heat exchanger 23 (and also from mass flow metering device 134) and return the liquid refrigerant back to pump 136 where the liquid refrigerant can again be used to cool battery 22. Meanwhile, the gaseous refrigerant contained within separator 144 may be released from separator 144 through a pressure regulation valve 150 located atop separator 144. After exiting pressure regulation valve 150, the gaseous refrigerant enters a second battery separator outlet line 152 that is connected to suction line 44 of compressor 40.

According to the above-described configuration of coolant system 28, the refrigerant that is typically used for controlling a temperature of a cabin of the vehicle 10 can also be used to simultaneously cool a drive assembly 94a, 94b of the vehicle 10 that includes an electric drive motor 12a, 12b and associated power electronics module 14a, 14b that includes a power inverter device. The refrigerant that is typically used for controlling the temperature of the cabin of the vehicle can also be used to cool a battery assembly 22 of the vehicle 10. Accordingly, a separate cooling system that requires a chiller to cool the drive assemblies 94a, 94b and/or battery 22 can be omitted.

The compressor 40 has a hot gas cycle loop 80 that is in fluid communication with the discharge line 50 through a tee joint 82. An expansion device with shutoff 84 receives hot refrigerant in the gas state which is communicated to a separator 86. The separator 86 also receives refrigerant from the loop 32, 34, 36 and 38.

The switching valve 140 receives refrigerant from the discharge line 50 through a tee joint 87 and a switching valve inlet line 88.

Figure 3:
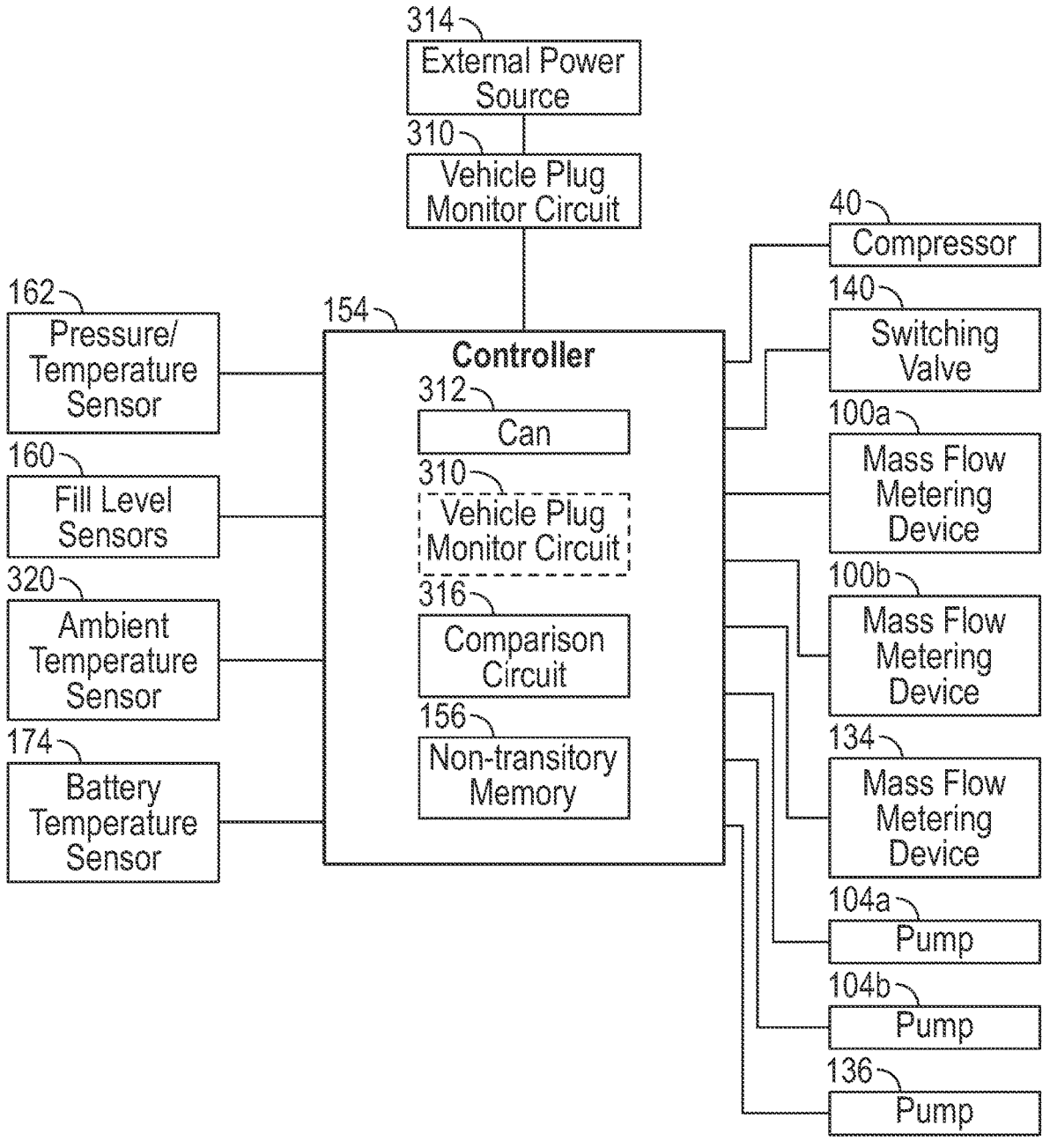

Referring now to FIGS. 2 and 3, cooling system 28 may include a controller 154 for controlling operation of various features of the cooling system 28 such as compressor 40, switching valve 140, mass flow devices 100a, 100b, 134, pumps 104a, 104b and 136, valve 63,66 of cabin loop 32, switching valves 63, 66, drive assemblies 94a, 94b, and battery 22. To simplify the figures the electrical connections are not illustrated in FIG. 2. Also not shown in FIG. 2, pumps 104a, 104b, and 136 may also be controlled by controller 154. Controller 154 may be an electronic control unit (ECU) of vehicle 10 having a non-transitory memory programmed to control the various functions of the system. The controller 154 may be separate from the ECU. Although not illustrated, it should be understood that controller 154 may also be used to operate various features of sub-loops 34, 36, and 38.

It should be understood that separators 120a, 120b, and 144 each include a fill or liquid level sensor 160 and pressure/temperature sensor 162. While only a single sensor 162 is illustrated for monitoring pressure and temperature, it should be understood that separators 120a, 120b, and 144 may include an individual sensor for monitoring pressure and an individual sensor for monitoring temperature. That is, the single sensor 162 illustrated in FIG. 3 for monitoring pressure/temperature is shown for simplicity of illustration.

The sub-loops 34, 36, and 38 are designed for cooling drive assemblies 94a, 94b (sometimes referred to as an Electric Drive Module or EDM) and battery 22 using refrigerant in two phases-a liquid phase of the refrigerant and a gas phase of the refrigerant. As noted above, the refrigerant used to cool drive assemblies 94a, 94b and battery 22, as it exchanges heat with these devices, will undergo phase change from liquid to gas. Once the two-phase mixture of refrigerant reaches separators 120a, 120b, and 144, the liquid refrigerant will settle in reservoirs 124a, 124b, and 146. The amount of liquid refrigerant contained in reservoirs 124a, 124b, and 146 may be monitored by liquid level sensors 160, and a signal indicative of the amount of refrigerant contained in reservoirs 124a, 124b, and 146 can be communicated to the controller 154.

Separators 120a, 120b, and 144 will also collect refrigerant in the gaseous phase. A temperature/pressure of the gaseous refrigerant contained in separators 120a, 120b, and 144 may be monitored by pressure/temperate sensor 162, and signal(s) indicative of the pressure and temperature of the gaseous refrigerant can be communicated to the respective controller 154.

The gaseous refrigerant contained in separators 120a, 120b, and 144 can be released from separators 120a, 120b, and 144 by operation of pressure regulation valves 128a, 128b, and 150. After exiting separators 120a, 120b, and 144, the gaseous refrigerant will subsequently be routed to suction line 44 for compression by compressor 40 before being directed to condenser 18, which condenses and cools the refrigerant. After exiting condenser 18, the now subcooled liquid refrigerant can then travel to each of the sub-loops 34, 36, and 38 by being drawn by pumps 104a, 104b, and 136, respectively.

According to the present disclosure, coolant system 28 is designed to control the amount of liquid refrigerant that is permitted to travel to sub-loops 34, 36, and 38 based on an amount of gaseous refrigerant that is released from separators 120a, 120b, and 144 by pressure regulation valves 128a, 128b, and 150. Put another way, the amount of liquid refrigerant that is permitted to travel back to sub-loops 34, 36, and 38 from condenser 18 is dictated by the amount of gaseous refrigerant that is released by pressure regulation valves 128a, 128b, and 150.

In an unmetered loop, by conservation of mass, the total amount of liquid refrigerant permitted to reenter the sub-loops 34, 36, and 38 from condenser 18 will be equal to the amount of gaseous refrigerant that is released by pressure regulation valves 128a, 128b, and 150 and returned to sub-loop 32 (cabin-refrigeration loop). It should be understood, however, that use of an unmetered loop would result in the sub-loops 34, 36, and 38 being full of only liquid refrigerant, which would not permit the sub-loops 34, 36, and 38 from benefitting from the refrigerant undergoing phase change to gas when cooling drive assemblies 94a, 94b, and battery 22. Accordingly, metering the amount of gaseous refrigerant that is permitted to exit separators 120a, 120b, and 144 by pressure regulation valves 128a, 128b, and 150 and metering the amount of liquid that can enter separators 120a, 120b, and 144 using mass flow metering devices 100a, 100b, and 134 can be used to slow the amount of liquid refrigerant flowing back to sub-loops 34, 36, and 38 from condenser 18 to more effectively utilize the refrigerant of cooling system 28 to cool drive assemblies 94a, 94b, and battery 22.

Controller 154 based on signals indicative of the amount of liquid contained in separators 120a, 120b, and 144 received from liquid level sensors 160, and signals indicative of pressure and temperature received from pressure/temperature sensors 162, may control pressure regulation valves 128a, 128b, and 150 and mass flow metering devices 100a, 100b, and 134 to dynamically control the amount of cooling provided to drive assemblies 94a, 94b, and battery 22, as needed.

While cooling of battery 22 is substantially similar to that of drive assemblies 94a, 94b, it should be understood that it is preferable that the pressure of the refrigerant at an inlet of pump 136 is controlled to be less in comparison to that of sub-loops 34 and 36 so that the temperature in sub-loop 38 having battery 22 will be low enough to allow for proper heat transfer away from battery 22.

Moreover, it should be understood that the pressure of the gaseous refrigerant exiting separators 120a, 120b, and 144 may be strictly controlled by pressure regulation valves 128a, 128b, and 150 to match a suction pressure located in suction line 44, which may be necessary for cabin heat exchanger 56 to operate properly (e.g., to permit sub-loop 32 to properly heat/cool a cabin 17 of the vehicle 10). Further, by matching the suction pressure in suction line 44, overall function of system 28 is ensured because proper directional flow of the refrigerant to the compressor 40 is maintained (i.e., the refrigerant will be unable to flow backwards in system 28) so that the gaseous refrigerant received from separators 120a, 120b, and 144 can be compressed by compressor 40 and then condensed by condenser 18.

The controller 154 may be in communication with a vehicle plug monitor circuit 310. The vehicle plug monitor circuit 310 may be disposed with the controller 154 or may be external circuit. The vehicle plug monitor circuit 310 generates a plug monitor signal that indicates the vehicle is plugged into a power source. The controller 154 may act in response to the plug monitor signal. If the vehicle plug monitor circuit 310 is disposed within the controller 154, the controller area network 312 may communicate the vehicle plug signal to the controller 154. Mechanical switching devices may sense to coupling of a plug to the vehicle. An electrical switching device may sense a charging voltage being coupled to the vehicle. As mentioned above, the compressor 40 consumes a lot of energy to form liquid refrigerant and therefore is desirable to operate the compressor 40 while the vehicle plug monitor circuit 310 indicates the vehicle 10 is plugged into an external power source 314. The energy from the external power source may operate the compressor directly or the compressor may be powered from the vehicle battery that is being charged.

The controller 154 also has a comparison circuit 316. The comparison circuit 316 may compare the fill levels from the fill level sensors 160 located at the various separators 120a, 120b and 144 to a fill level threshold. The system may act to fill the separators 120a, 120b and 144 with liquid in an uncontrolled manner or in a controlled manner. That is, the system may be used to prioritize the loop 34, 36 or 38 that receives the liquid refrigerant when controlled. For example, pre-loading liquid refrigerant in the separator 144 in loop 38 may be desirable since the battery 22 typically requires more cooling than other components. Pre-loading liquid refrigerant in the separator 144 is therefore desirable. In one example, the mass flow device 134 associated with loop 38 may be opened before the mass flow devices 100a, 100b of loop 34 and 36, respectively.

The comparison circuit 316 may be used to compare the temperature at the separator to a temperature threshold or the pressure at the pressure threshold to a pressure threshold.

Either or both comparisons may be used to determine whether filling the separator with liquid refrigerant is to be initiated.

The controller 154 may also be in communication with an ambient temperature sensor 320 that generates an ambient temperature signal corresponding to a vehicle temperature of or around the vehicle. The ambient temperature sensor 320 may be directly coupled to the controller 154. However, the ambient temperature may also be communicated through the controller area network 312. The comparison circuit 316 may also compare the ambient temperature to an ambient temperature threshold. That is, the ambient temperature may be used to determine whether or not cooling is desired and therefore whether or not pre-loading of liquid refrigerant is desired.

Figure 4:
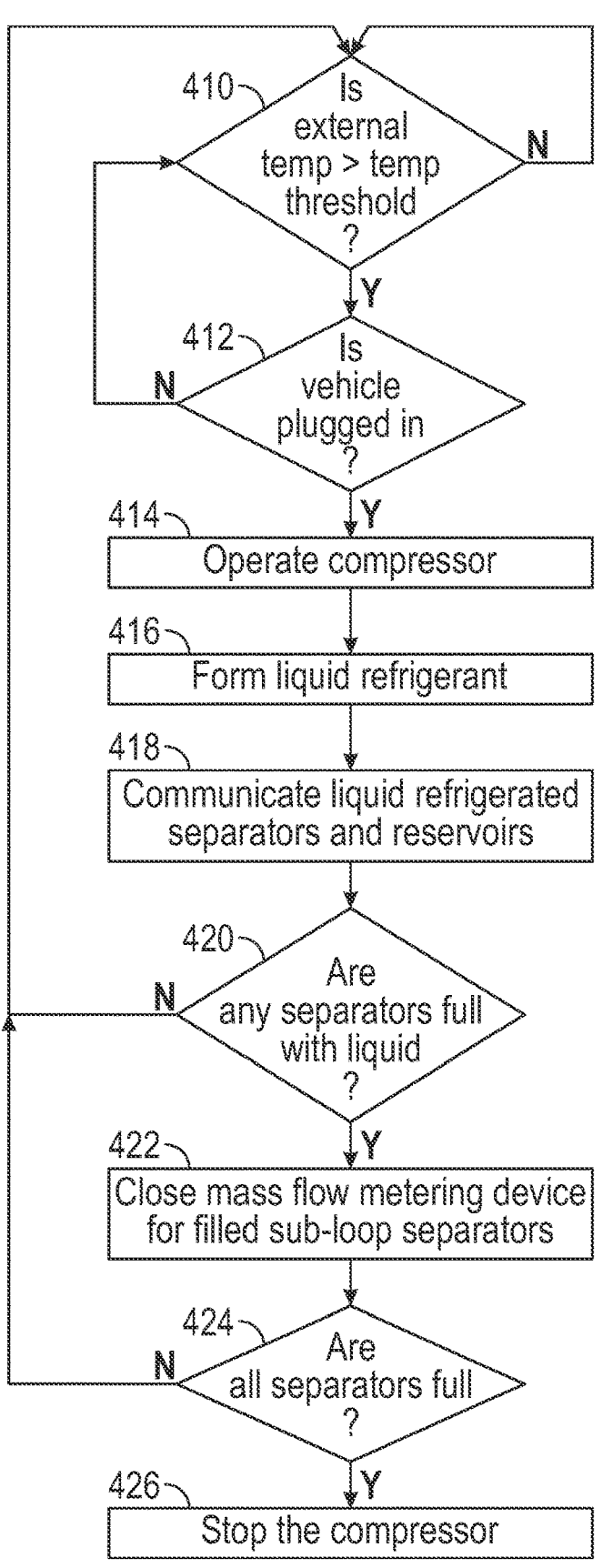
FIG. 4 is a flowchart of a method for operating the refrigerant fill level system.

Referring now to FIG. 4, step 410 determines whether the external temperature is greater than a temperature threshold. If the temperature is not greater than a temperature threshold, step 410 is repeated.

In step 410, when the temperature is greater than an external temperature threshold, step 412 determines whether the vehicle is plugged in. As mentioned above, the vehicle plug monitor circuit 310 generates a signal corresponding to whether the vehicle is plugged in. When the vehicle is not plugged in, step 410 is repeated. After step 412, when the vehicle is plugged in, step 414 operates the compressor 40. That is, the compressor is used to circulate refrigerant through the cooling loop so that liquid refrigerant is formed at the condenser in step 416. After step 416, the liquid refrigerant is communicated to the separators 120a, 120b and 144. The compressor may continuously operate, or step 420 may be performed. In step 420, it is determined whether any of the separators are filed with liquid such as at or above a fill level threshold. This may be determined using the signal from the fill level sensor 160 in comparison to the fill level threshold as described above. In step 420, when all the separators are not full, the system repeats in step 410. If any of the separators are filled with liquid (to the fill level threshold), step 422 closes the mass flow metering device for the filled sub-loop or sub-loops. Thereafter, step 424 determines whether all the subloops are filled. If in step 424 all the sub-loop separators are filled, the system generates a signal to stop the compressor in step 426. In step 424 when all the sub-loops are not filled, step 410 is performed, and the process is repeated. Of course, the system may continuously cycle without stopping when plugged into external power since liquid refrigerant would merely be recycled when the reservoir of the separators is full.

Figure 5:
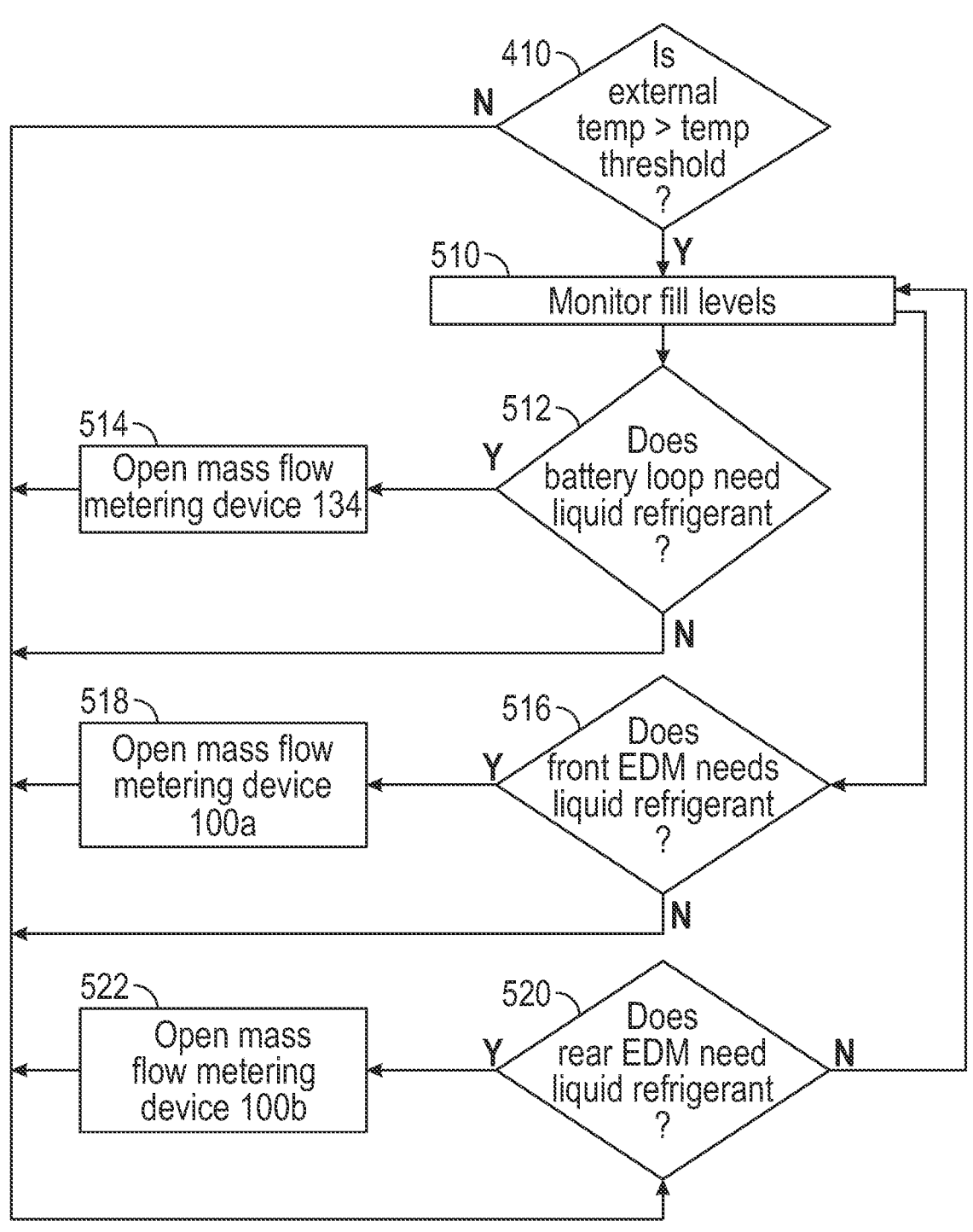
FIG. 5 is a flowchart of a method for operating the fill level system based on prioritizing.

Referring now to FIG. 5, the system may also monitor the fill level and determine whether specific loops require cooling. That is, a sub-loop may intentionally be prioritized to receive liquid refrigerant. In step 410, the external temperature is compared to a temperature threshold in a similar manner to that set forth in FIG. 4. When the temperature is greater than a temperature threshold, step 510 monitors the fill level at each of the separators 120a, 120b and 144. In step 512, the controller 154 monitors whether the separator 144 indicates that the battery cooling sub-loop 38 needs liquid refrigerant. This may be done by comparing the fill level signal to a fill level threshold. Likewise, temperature and pressure may be compared to respective thresholds to determine the need for further liquid refrigerant in a separator. When the battery loop 38 needs liquid refrigerant, step 514 opens the mass flow metering device 134 and may close the mass flow metering devices 100a, 100b in the other loops. In step 512, when the battery loop does not require liquid refrigerant, the system repeats in step 410.

Monitoring the fill levels in step 510 is for all monitored separators. After step 510 step 516 may also be performed. In step 516, the controller 154 determines whether the front EDM fluid circuit 34 is low in liquid refrigerant. When the front EDM fluid circuit 34 requires liquid refrigerant, step 518 is performed in which the mass flow metering device 100*a* is open to allow liquid refrigerant to be communicated to the separator 120*a*.

When the front EDM loop 34 does not need liquid refrigerant, step 518 is bypassed, and the system repeats at step 410.

In step 510, after monitoring the fill levels, step 520 is also performed. Step 520 determines whether the rear EDM cooling circuit 36 is low in liquid refrigerant. When the rear EDM circuit does need liquid refrigerant, step 522 opens the mass flow metering device 100*b* to communicate liquid refrigerant to the separator 120*b*. After step 522 and when the rear EDM cooling circuit 36 does not require liquid refrigerant, step 410 repeats the process. Both steps 516 and 512 may determine the need for liquid refrigerant based on the fill level sensor and a comparison with the fill level threshold or a temperature comparison or pressure comparison.

By following the above process, the controller 154 may prioritize the circuit that is most likely to need liquid refrigerant first. As mentioned above, the battery circuit during charging and, in particular, fast charging, heat is generated. The heat generated may cause liquid refrigerant to vaporize and lower the level of liquid in the associated separator while charging. Therefore, the liquid in the loop 38 will dissipate even while charging. Therefore, the battery circuit loop 38 may be prioritized and the system repeated while the vehicle remains coupled to an external power source. As mentioned above, the temperature and pressure signals from a temperature and pressure sensor may also be used by the EDM to determine whether the loops 32, 34, 36 and 38 require liquid coolant.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cooling system for an electric vehicle, comprising:
   a cooling system loop including a compressor and a refrigerant;
   a first sub-loop of the cooling system loop including a condenser that receives refrigerant from the compressor, and an evaporator that receives at least a portion of the refrigerant from the condenser;
   a second sub-loop and a third sub-loop of the cooling system loop configured to receive portions of the refrigerant in a liquid phase after the refrigerant exits the condenser,
   wherein the second sub-loop includes a first mass flow metering device configured to receive the portion of the refrigerant in the liquid phase from the condenser, a first separator configured to receive the portion of the refrigerant in the liquid phase from the first mass flow metering device, and a first component located downstream from the first separator;

wherein the third sub-loop includes a second mass flow metering device configured to receive the portion of the refrigerant in the liquid phase from the condenser, a second separator configured to receive the portion of the refrigerant in the liquid phase from the second mass flow metering device, and a second component located downstream from the second separator;
   a vehicle plug monitor circuit generating a plug monitor signal when the vehicle is coupled to an external power source; and
   a controller operating the compressor in response to the plug monitor signal to communicate the portions of the refrigerant in the liquid phase to the first and second separators, the controller configured to control an amount of the portions of the refrigerant in the liquid phase that enters each of the second sub-loop and the third sub-loop,
   wherein each of the first and second separators include a pressure regulation valve that permits gaseous refrigerant to exit the first and second separators and enter a fluid line that feeds the gaseous refrigerant back to the compressor.

2. The cooling system of claim 1, wherein each of the first sub-loop and the second sub-loop
   includes a pump configured to draw the portion of the refrigerant in the liquid phase from the first and second separators, respectively, and feed the portion of the refrigerant in the liquid phase to the first component and the second component, respectively.

3. The cooling system of claim 1, wherein the controller is in communication with each of the first and second mass flow metering devices, and
   wherein the controller is configured to operate each of the first and second mass flow metering devices to control an amount of the refrigerant in the liquid phase that passes through the first and second mass flow metering devices, respectively, to control the amount of the refrigerant in the liquid phase that travels to the first and second separators, respectively.

4. The cooling system of claim 3, wherein the first and second separators each include a plurality of sensors,
   a first sensor of the plurality of sensors is configured to generate a signal indicative of an amount of the refrigerant in the liquid phase contained in the first and second separators, respectively, and
   based on the signals generated by the first sensor, the controller is configured to control the amount of the refrigerant that passes through the first and second mass flow metering devices in the liquid phase to the first and second separators, respectively.

5. The cooling system of claim 2, wherein the first component is a battery.

6. The cooling system of claim 5, wherein the second component is a drive assembly of the electric vehicle that includes at least one of an electric drive motor and a power inverter device.

7. The cooling system of claim 6, wherein the controller controls the first mass flow metering device to communicate liquid refrigerant from the compressor and condenser to the first sub-loop before the second sub-loop.

8. The cooling system of claim 1, further comprising a temperature sensor generating a temperature signal corresponding to a vehicle temperature, the controller configured to operate the compressor to communicate liquid refrigerant to the first and second separators in response to the plug monitor signal and the temperature signal.

9. A method of operating the coolant system according to claim 1, comprising:

generating a plug monitor signal when the vehicle is coupled to an external power source; and operating, by a controller, the compressor in response to the plug monitor signal to communicate liquid refrigerant to the first and second separators.

\* \* \* \* \*